US007821387B2

(12) United States Patent
Okumura et al.

(10) Patent No.: US 7,821,387 B2
(45) Date of Patent: Oct. 26, 2010

(54) DISPLAY UNIT AND METHOD FOR DISPLAYING IMAGE

(75) Inventors: Tomohiro Okumura, Kariya (JP); Ryouichi Nishikawa, Nagoya (JP)

(73) Assignee: Denso Corporation, Kariya (JP)

( * ) Notice: Subject to any disclaimer, the term of this patent is extended or adjusted under 35 U.S.C. 154(b) by 242 days.

(21) Appl. No.: 12/078,987

(22) Filed: Apr. 9, 2008

(65) Prior Publication Data

US 2008/0266075 A1 Oct. 30, 2008

(30) Foreign Application Priority Data

Apr. 27, 2007 (JP) ............................ 2007-119889

(51) Int. Cl.
*B60Q 1/00* (2006.01)

(52) U.S. Cl. ...................................................... 340/461

(58) Field of Classification Search ................. 340/461, 340/438, 441; 345/87, 555
See application file for complete search history.

(56) References Cited

U.S. PATENT DOCUMENTS 5,764,139 A * 6/1998 Nojima et al. .............. 340/461
6,298,290 B1 * 10/2001 Abe et al. ..................... 701/35
7,522,134 B2 * 4/2009 Mizumaki .................... 345/87
2001/0009419 A1 * 7/2001 Ikeno et al. ................. 345/555
2005/0212809 A1 * 9/2005 Sadazumi et al. ........... 345/555

FOREIGN PATENT DOCUMENTS

| | | |
|---|---|---|
| JP | 6-186924 | 7/1994 |
| JP | 08-263036 | 10/1996 |
| JP | 09-034428 | 2/1997 |
| JP | 2000-259141 | 9/2000 |
| JP | 2004-182092 | 7/2004 |
| JP | 2006-256601 | 9/2006 |

OTHER PUBLICATIONS

Japanese Office Action dated Apr. 28, 2009, issued in corresponding Japanese Application No. 2007-119889, with English translation.
Okumura et al; U.S. Appl. No. 12/078,988, filed Apr. 9, 2008.

* cited by examiner

*Primary Examiner*—Phung Nguyen
(74) *Attorney, Agent, or Firm*—Nixon & Vanderhye, PC

(57) ABSTRACT

A display unit includes: a display panel for displaying an information image; a memory for storing a compressed image data element corresponding to the information image; an image memory for storing the compressed image data element transferred from the memory; and a controller for decompressing the compressed image data element stored in the image memory and for controlling the display panel to display the information image based on a decompressed image data element.

11 Claims, 3 Drawing Sheets

DISPLAY UNIT AND METHOD FOR DISPLAYING IMAGE

CROSS REFERENCE TO RELATED APPLICATION

This application is based on Japanese Patent Application No. 2007-119889 filed on Apr. 27, 2007, the disclosure of which is incorporated herein by reference. This application is also related to U.S. patent application Ser. No. 12/078,988, entitled "DISPLAY UNIT AND METHOD FOR DISPLAYING MULTIPLE IMAGES", filed on Apr. 9, 2008.

FIELD OF THE INVENTION

The present invention relates to a display unit and a method for displaying an image.

BACKGROUND OF THE INVENTION

A display for a vehicle is capable of displaying multiple images such as an information image showing a speed of the vehicle and an image showing the number of revolutions of an engine. For example, U.S. Pat. No. 5,764,139 discloses a display having a display panel made of liquid crystal. The panel includes multiple pixels, which provide a matrix system. The multiple images are shown on the panel.

A ROM stores an image data element corresponding to each information image. Multiple image data elements are transferred from the ROM to an image memory, and the image memory memorizes the multiple image data elements. Based on the image data elements in the image memory, multiple information images are shown on the panel. Since data capacity of each image data element is large, it takes much time to transfer and memorize the multiple image data elements from the ROM to the image memory. Accordingly, when the display starts to operate, a time interval, in which the display panel does not display anything, becomes long.

Thus, it is required to shorten the time interval when the display displays nothing in a case where the display starts to operate.

SUMMARY OF THE INVENTION

In view of the above-described problem, it is an object of the present disclosure to provide a display unit for displaying an image. It is another object of the present disclosure to provide a method for displaying an image.

According to a first aspect of the present disclosure, a display unit includes: a display panel for displaying an information image; a memory for storing a compressed image data element corresponding to the information image; an image memory for storing the compressed image data element transferred from the memory; and a controller for decompressing the compressed image data element stored in the image memory and for controlling the display panel to display the information image based on a decompressed image data element.

In the above unit, a time interval from start of operation of the unit to display of information is shortened. Thus, display performance of the unit is improved.

Alternatively, the information image may include a physical quantity information image, which represents physical quantity information. The physical quantity information image includes a scale image for providing a scale and a pointer image for providing a pointer, and the controller controls the display panel to display the physical quantity information image in such a manner that the pointer image is capable of moving along with the scale image according to the physical quantity information.

According to a second aspect of the present disclosure, a display unit includes: a display panel for displaying a plurality of information images; a first memory for storing a plurality of compressed image data elements, which corresponds to the plurality of information images; a second memory for storing the plurality of compressed image data elements transferred from the first memory, wherein the second memory provides an image memory; and a controller for decompressing all of the compressed image data elements stored in the second memory and for controlling the display panel to display all of the information images based on decompressed image data elements. The controller transfers all of the compressed image data elements from the first memory to the second memory in a direct memory access manner so that all of the compressed image data elements are directly written in the second memory. The display unit is mounted on a vehicle, and the information images provide at least one of information about vehicle speed and information about the number of revolution of an engine.

In the above unit, a time interval from start of operation of the unit to display of information is shortened. Thus, display performance of the unit is improved.

According to a third aspect of the present disclosure, a method for displaying a plurality of information images includes: storing a plurality of compressed image data elements in a first memory, wherein the plurality of compressed image data elements corresponds to the plurality of information images; transferring all of the compressed image data elements from the first memory to a second memory in a direct memory access manner so that all of the compressed image data elements are directly written in the second memory, wherein the second memory provides an image memory; storing the plurality of compressed image data elements in the second memory, the compressed image data elements transferred from the first memory; decompressing all of the compressed image data elements stored in the second memory; and controlling a display panel to display all of the information images based on decompressed image data elements. The display unit is mounted on a vehicle, and the information images provide at least one of information about vehicle speed and information about the number of revolution of an engine.

In the above method, a time interval from start of operation to display of information is shortened. Thus, display performance is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
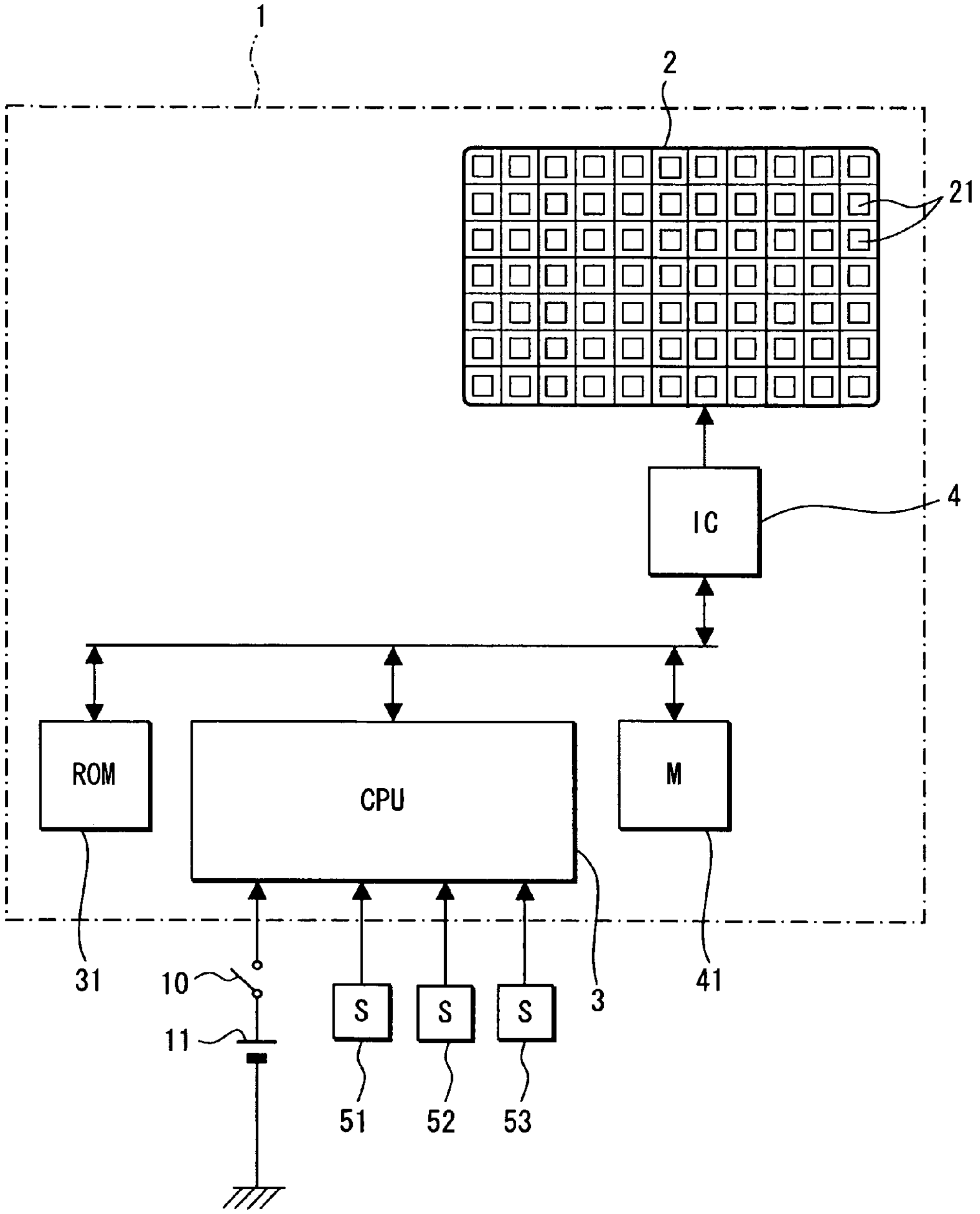
FIG. 1 is a circuit diagram showing a display unit.

FIG. 1 shows a display unit 1, which is suitably used for a vehicle. The unit 1 includes a liquid crystal panel 2 as a display panel, a CPU (i.e., central processing unit) 3 and an image IC 4 as a controller, a flash ROM 31 as a memory and an image memory 41 capable of rewriting memorized data.

The panel 2 has multiple pixels 21, which provide a matrix system. The panel 2 is an active matrix type liquid crystal panel, which is driven with a thin film transistor (i.e., TFT, not shown). Each pixel 21 has a red element, a green element and a blue element. By applying a voltage to a gate of the TFT, a voltage applied to each of the red, green and blue elements in the pixel 21 is controlled. Thus, the optical transmission rate of each of the red, green and blue elements is controlled. A light-emitting diode (not shown) for emitting white light is arranged behind the panel 2 so that the light-emitting diode illuminates the panel 2. The light-emitting diode transparently illuminates each pixel 21, which has the red, green and blue elements with controlled optical transmission rates, thereby, the panel 2 displays an image in full color.

The CPU 3 retrieves information such as the number of revolutions of an engine of a vehicle, a vehicle speed, indicator information and warning information from a rotation sensor 51, a speed sensor 52 and an indicator/warning sensor 53. Then, the CPU 3 inputs the information data to the image IC 4. The CPU 3 is energized by a battery 11 through an ignition switch 10 of the vehicle.

The rotation sensor 51 detects the number of revolutions of the engine, and the speed sensor 52 detects speed of the vehicle. The indicator/warning sensor 53 detects information related to an indicator or a warning element. The indicator shows operation conditions of equipment in the vehicle, and the warning element warns an abnormal condition of the vehicle.

Figure 2:
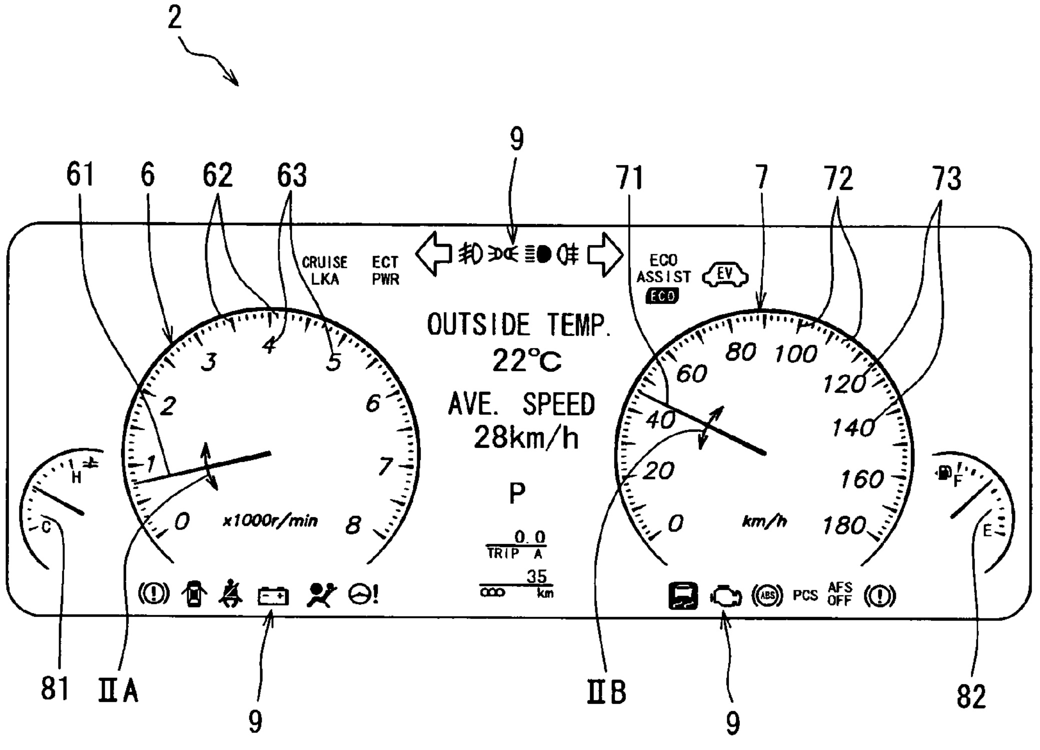
FIG. 2 is a front view showing a liquid crystal panel in the display unit.

The flash ROM 31 stores a compressed image data element corresponding to a rotation meter image 6, a compressed image data element corresponding to a speed meter image 7, and a compressed image data element corresponding to an indicator/warning image 9 and so on, as shown in FIG. 2. Here, an image data element corresponding to each image is compressed so that a compressed image data element is formed.

The CPU 3 instructs to transfer the compressed data elements from the flash ROM 31 to the image memory 41 without processing the data elements in the CPU 3 so that the compressed data elements are directly written in the memory 41. This transfer provides a DMA (direct memory access) transfer. The image IC 4 decompresses the compressed data elements in the memory 41. Further, the image IC 4 controls the voltage to be applied to each of the red, green and blue elements in each pixel 21, based on the decompressed image data elements and the information such as the number of revolutions of the engine, the vehicle speed and the indicator/warning information. Thus, displaying condition of each pixel 21 is controlled, thereby, the panel 2 displays multiple information images such as the rotation meter image 6, the speed meter image 7, the indicator/warning image 9 and the like.

The rotation meter image 6 shows the number of revolutions of the engine. Here, the number of revolutions is physical quantity. The rotation meter image 6 includes a scale image 62 for providing a scale, a character image 63 for providing a character, and a pointer image 61 for providing a pointer to point the scale image 62 and the character image 63. The CPU 3 and the image IC 4 decompress the compressed image data element corresponding to the rotation meter image 6 stored in the image memory 41. Further, the CPU 3 and the image IC 4 control to display the rotation meter image 6, based on the decompressed image data element corresponding to the rotation meter image 6 and the number of revolutions of the engine inputted in the CPU 3 so that the pointer image 61 rotates in a direction IIA along with the scale image 62 according to the number of revolutions of the engine. Thus, the rotation meter image 6 including the pointer image 61 can show the number of revolutions of the engine.

The speed meter image 7 shows the vehicle speed as the physical quantity. The speed meter image 7 includes a scale image 72 for providing a scale, a character image 73 for providing a character, and a pointer image 71 for providing a pointer to point the scale image 72 and the character image 73. The CPU 3 and the image IC 4 decompress the compressed image data element corresponding to the speed meter image 7 stored in the image memory 41. The CPU 3 and the image IC 4 control to display the speed meter image 7, based on the decompressed image data element corresponding to the speed meter image 7 and the vehicle speed inputted in the CPU 3 so that the pointer image 71 rotates in a direction IIB along with the scale image 72 according to the vehicle speed. Thus, the speed meter image 7 including the pointer image 71 can show the vehicle speed.

A water temperature meter image 81 shows temperature of engine cooling water in the vehicle, and a fuel meter image 82 shows remaining fuel in the vehicle. Here, the temperature of the engine cooling water and the remaining fuel are physical quantity. Similar to the rotation meter image 6 and the speed meter image 7, the water temperature meter image 81 can show the temperature of engine cooling water, and the fuel meter image 82 can show the remaining fuel.

The indicator/warning image 9 shows indicator information and warning information. The CPU 3 and the image IC 4 decompress the compressed image data element corresponding to the indicator/warning image 9 stored in the image memory 41. Based on the decompressed image data element corresponding to the indicator/warning image 9, the indicator information and the warning information, the indicator/warning image 9 is controlled. For example, according to the indicator information and the warning information, the indicator/warning image 9 is displayed or not displayed. Alternatively, color of the indicator/warning image 9 may be switched. Thus, the indicator/warning image 9 can show the indicator information and the warning information.

When the ignition switch 10 turns on, the battery 11 energizes the CPU 3 so that the CPU 3 functions. Thus, the display unit 1 starts to operate. At the time of starting, the CPU 3 transfers all compressed image data elements to the image memory 41 in a DMA transfer manner.

Since the compressed image data elements are transferred from the flash ROM 31 to the image memory 41, the transfer time is reduced, compared with a case where original image data elements are transferred from the flash ROM 31 to the image memory 41. Here, the original image data element means that the image data element is not compressed. Further, multiple image data elements are transferred from the flash ROM 31 to the image memory 41. Thus, reduction of transfer time in each compressed image data element is added so that total transfer time is much reduced, compared with multiple image data elements are transferred. Further, by using the DMA transfer technique, the compressed image data elements are directly written in the image memory 41 from the flash ROM 31 without processing the data elements in the CPU 3. Thus, the transfer time is much reduced.

Furthermore, since multiple compressed image data elements are stored in the flash ROM 31, it is not necessary to compress multiple original image data elements. The CPU 3 and the image IC 4 decompress multiple compressed image data elements stored in the image memory 41 and transferred from the flash ROM 31. Based on the decompressed image data elements and the information such as the number of revolutions of the engine, the information images 6-9 are displayed on the panel 2.

Accordingly, the time interval, i.e., the time delay from the start of operation of the unit 1 to the display of all information images 6-9 is much reduced, compared with a case where all of the original image data elements are transferred from the flash ROM 31 to the image memory 41, and all images 6-9 are displayed on the panel 2. Specifically, the time interval in which the display unit 1 displays nothing in case of starting of the display unit 1 can be shortened.

Figure 3:
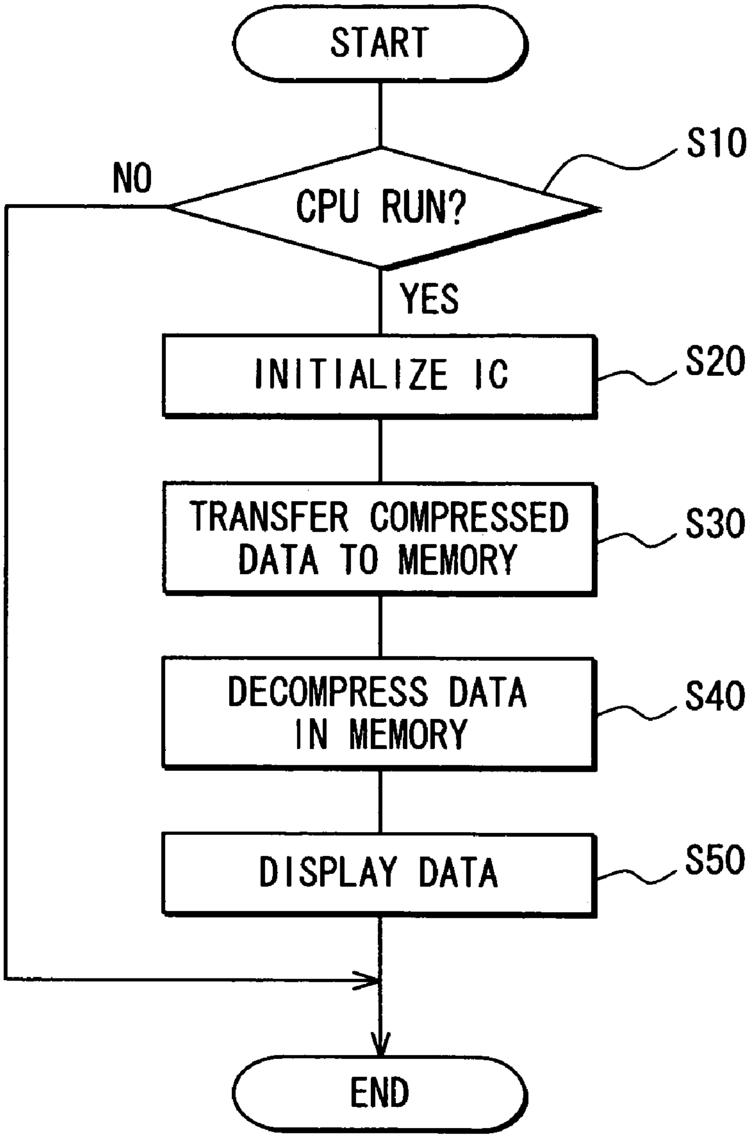
FIG. 3 is a flowchart showing a control process executed by a CPU.

When the display unit 1 starts to operate, the control process executed by the CPU 3 is shown in FIG. 3.

First, the ignition switch 10 turns on so that the control process starts. In Step S10, it is determined whether the CPU 3 runs or is activated. When it is determined "YES" in Step S10, i.e., when the CPU 3 is activated, in Step S20, the image IC 4 is initialized. Thus, Step S20 represents an initialization step.

After Step S20, in Step S30, all compressed image data elements corresponding to the information images 6-9 are transferred from the flash ROM 31 to the image memory 41 in the DMA transfer manner. After Step S30, in Step S40, all compressed image data elements stored in the memory 41 are decompressed, thereby, all of the original image data elements (i.e., decompressed image data elements) are obtained. After Step S40, in Step S50, based on all of the original image data elements and further based on the information such as the number of revolutions of the engine, as shown in FIG. 2, all information images 6-9 are displayed on the panel 2.

After Step S50, the control process ends. Further, when it is decided "NO" in Step S10, i.e., when it is determined that the CPU 3 is not activated, the control process ends.

The display unit 1 includes the liquid crystal panel 2, the flash ROM 31, the image memory 41, the CPU 3 and the image IC 4. The panel 2 is capable of displaying multiple information images such as the rotation meter image 6, the speed meter image 7, the water temperature meter image 81, the fuel meter image 82, and the indicator/warning image 9. The flash ROM 31 stores multiple compressed image data elements corresponding to the information images 6, 7, 81, 82, 91, 92. The image memory 41 stores the compressed image data elements transferred from the flash ROM 31 in the DMA transfer manner. The CPU 3 and the image IC 4 decompress the compressed image data elements stored in the memory 41. Further, based on the decompressed image data elements, the CPU 3 and the image IC 4 controls to display the information images 6-9 on the panel 2. Thus, the time delay from the start of the display unit 1 to the display of the images is reduced. Specifically, the time interval in which the display unit 1 displays nothing in case of starting of the display unit 1 can be shortened.

(Modifications)

The display panel may display one information image. In this case, a compressed image data element corresponding to the one information image is stored in the flash ROM 31, and the compressed image data element is transferred from the ROM 31 to the image memory 41 so that the compressed image data element is stored in the memory 41. Further, the CPU 3 and the image IC 4 decompress the compressed image data element in the memory 41. Based on the decompressed image data element, the one information image is displayed on the panel 2.

Since the one compressed image data element is transferred from the flash ROM 31 to the image memory 41, the transfer time is reduced, compared with a case where one original image data element is transferred from the ROM 31 to the memory 41. Further, since the one compressed image data element is stored in the ROM 31, it is not necessary to compress the one original image data element. Further, the one compressed image data element in the memory 41 is decompressed, and then, based on the decompressed image data element, the one information image is displayed on the panel 2.

Accordingly, the time interval, i.e., the time delay from the start of operation of the unit 1 to the display of the one information image is much reduced, compared with a case where the one original image data element is transferred from the flash ROM 31 to the image memory 41, and the one image is displayed on the panel 2. Specifically, the time interval in which the display unit 1 displays nothing in case of starting of the display unit 1 can be shortened.

Although the unit 1 includes the flash ROM 31 for storing the compressed image data elements, the unit 1 may include a conventional ROM.

Although the panel 2 is capable of displaying in full color, the panel 2 may display in monochrome.

Although the panel 2 is a light receiving type panel, i.e., although the panel 2 is a non-emitting type panel, the panel may be formed of a light emitting type panel such as an EL display panel.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A display unit comprising:

a display panel for displaying an information image;

a memory for storing a compressed image data element corresponding to the information image;

an image memory for storing the compressed image data element transferred from the memory; and a controller for decompressing the compressed image data element stored in the image memory and for controlling the display panel to display the information image based on a decompressed image data element, wherein the controller transfers the compressed image data element from the memory to the image memory in a direct memory access manner so that the compressed image data element is directly written in the image memory.

2. The display unit according to claim 1, wherein the display panel is capable of displaying a plurality of information images, the memory is capable of storing a plurality of compressed image data elements corresponding to the information images, the image memory is capable of storing the compressed image data elements transferred from the memory, the controller is capable of decompressing the compressed image data elements stored in the image memory, and the controller is capable of controlling the display panel to display the information images based on decompressed image data elements.

3. The display unit according to claim 2, wherein the controller controls the display panel to display all of the information images at the same time.

4. The display unit according to claim 1, wherein the information image includes a physical quantity information image, which represents physical quantity information, the physical quantity information image includes a scale image for providing a scale and a pointer image for providing a pointer, and the controller controls the display panel to display the physical quantity information image in such a manner that the pointer image is capable of moving along with the scale image according to the physical quantity information.

5. The display unit according to claim 1, wherein the display unit is mounted on a vehicle, and the information image represents at least one of information about vehicle speed and information about the number of revolution of an engine.

6. A display unit comprising:

a display panel for displaying a plurality of information images;

a first memory for storing a plurality of compressed image data elements, which corresponds to the plurality of information images;

a second memory for storing the plurality of compressed image data elements transferred from the first memory, wherein the second memory provides an image memory; and a controller for decompressing all of the compressed image data elements stored in the second memory and for controlling the display panel to display all of the information images based on decompressed image data elements, wherein the controller transfers all of the compressed image data elements from the first memory to the second memory in a direct memory access manner so that all of the compressed image data elements are directly written in the second memory, the display unit is mounted on a vehicle, and the information images provide at least one of information about vehicle speed and information about the number of revolution of an engine.

7. A method for displaying a plurality of information images comprising:

storing a plurality of compressed image data elements in a first memory, wherein the plurality of compressed image data elements corresponds to the plurality of information images;

transferring all of the compressed image data elements from the first memory to a second memory in a direct memory access manner so that all of the compressed image data elements are directly written in the second memory, wherein the second memory provides an image memory;

storing the plurality of compressed image data elements in the second memory, the compressed image data elements transferred from the first memory;

decompressing all of the compressed image data elements stored in the second memory; and controlling a display panel to display all of the information images based on decompressed image data elements, wherein the display unit is mounted on a vehicle, and the information images provide at least one of information about vehicle speed and information about the number of revolution of an engine.

8. A display unit comprising:

a display panel for displaying an information image;

a memory for storing a compressed image data element corresponding to the information image;

an image memory for storing the compressed image data element transferred from the memory; and a controller for decompressing the compressed image data element stored in the image memory and for controlling the display panel to display the information image based on a decompressed image data element, wherein the information image includes a physical quantity information image, which represents physical quantity information, the physical quantity information image includes a scale image for providing a scale and a pointer image for providing a pointer, and the controller controls the display panel to display the physical quantity information image in such a manner that the pointer image is capable of moving along with the scale image according to the physical quantity information.

9. The display unit according to claim 8, wherein the display panel is capable of displaying a plurality of information images, the memory is capable of storing a plurality of compressed image data elements corresponding to the information images, the image memory is capable of storing the compressed image data elements transferred from the memory, the controller is capable of decompressing the compressed image data elements stored in the image memory, and the controller is capable of controlling the display panel to display the information images based on decompressed image data elements.

10. The display unit according to claim 9, wherein the controller controls the display panel to display all of the information images at the same time.

11. The display unit according to claim 8, wherein the display unit is mounted on a vehicle, and the information image represents at least one of information about vehicle speed and information about the number of revolution of an engine.

* * * * *